(12) United States Patent
Killian et al.

(10) Patent No.: US 7,340,457 B1
(45) Date of Patent: Mar. 4, 2008

(54) APPARATUS AND METHOD TO FACILITATE THE CUSTOMIZATION OF TELEVISION CONTENT WITH SUPPLEMENTAL DATA

(75) Inventors: Todd Killian, Dallas, TX (US); Philip Thrift, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1508 days.

(21) Appl. No.: 09/713,432

(22) Filed: Nov. 15, 2000

Related U.S. Application Data

(60) Provisional application No. 60/172,304, filed on Dec. 16, 1999.

(51) Int. Cl.
  G06F 17/30 (2006.01)
  G06F 7/00 (2006.01)
(52) U.S. Cl. .................. 707/5; 370/480; 707/104.1
(58) Field of Classification Search ................ 707/1–2, 707/6, 104.1
  See application file for complete search history.

(56) References Cited

U.S. PATENT DOCUMENTS

| | | | | |
|---|---|---|---|---|
| 5,155,591 A * | 10/1992 | Wachob | ........................ | 725/35 |
| 5,485,221 A * | 1/1996 | Banker et al. | .............. | 348/563 |
| 5,579,057 A * | 11/1996 | Banker et al. | .............. | 348/589 |
| 5,583,763 A * | 12/1996 | Atcheson et al. | .............. | 707/3 |
| 5,636,346 A * | 6/1997 | Saxe | .............................. | 705/1 |
| 5,717,923 A * | 2/1998 | Dedrick | ....................... | 707/102 |
| 5,754,938 A * | 5/1998 | Herz et al. | ................... | 725/116 |
| 5,758,257 A * | 5/1998 | Herz et al. | ................... | 725/116 |
| 5,823,879 A * | 10/1998 | Goldberg et al. | ............. | 463/42 |
| 5,861,881 A * | 1/1999 | Freeman et al. | ......... | 715/500.1 |
| 6,020,880 A * | 2/2000 | Naimpally | ................... | 725/48 |
| 6,029,195 A * | 2/2000 | Herz | ........................... | 725/116 |
| 6,081,693 A * | 6/2000 | Wicks | ........................ | 340/7.21 |
| 6,088,722 A * | 7/2000 | Herz et al. | ................... | 709/217 |
| 6,163,316 A * | 12/2000 | Killian | ........................ | 345/721 |
| 6,189,008 B1 * | 2/2001 | Easty et al. | ..................... | 707/10 |
| 6,195,652 B1 * | 2/2001 | Fish | .............................. | 707/2 |
| 6,233,389 B1 * | 5/2001 | Barton et al. | ................. | 386/46 |
| 6,236,395 B1 * | 5/2001 | Sezan et al. | ................. | 345/723 |
| 6,457,010 B1 * | 9/2002 | Eldering et al. | .............. | 707/10 |
| 6,463,585 B1 * | 10/2002 | Hendricks et al. | ............ | 725/35 |
| 6,510,557 B1 * | 1/2003 | Thrift | ......................... | 725/110 |

OTHER PUBLICATIONS

Michael Ehrmantraut, Theo Harder, Hartmut Wittig, Ralf Steinmetz. "The Personal Electronic Program Guide—Towards the Pre-selection of Individual TV Programs". ACM Press 1996. pp. 243-260. Proceedings of the fifth international conference on Information and knowledge management.*

Peter Meuleman, Anita Heister, Han Kohar, Douglas Tedd. "Double Agent—Presentation and Filtering Agents for a Digital Television Recording System". CHI 98 conference summary on Human factors in computing systems. ACM Press. 1998 pp. 3-4.*

* cited by examiner

Primary Examiner—Luke S Wassum
(74) Attorney, Agent, or Firm—Robert D. Marshall, Jr.; W. James Brady; Frederick J. Telecky, Jr.

(57) ABSTRACT

An apparatus and method for customizing television content uses an application (70) operating on a computing platform (12) associated with a display device (40). The platform (12) accesses a display component database (48) containing display components (6). The application (70) includes a profile database (80) that stores a viewer profile (84) and a filter module (76) that is coupled to the profile database (80). The filter module (76) accesses the viewer profile (84) and display components (6) and, in response, selects a preferred display component (6') according to the viewer profile (84) and the display components (6). The preferred display component (6') facilitates the targeting of viewers based on demographic information.

14 Claims, 3 Drawing Sheets

APPARATUS AND METHOD TO FACILITATE THE CUSTOMIZATION OF TELEVISION CONTENT WITH SUPPLEMENTAL DATA

This application claims priority under 35 USC §119(e)(1) of Provisional Application No. 60/172,304, filed Dec. 16, 1999.

TECHNICAL FIELD OF THE INVENTION

This invention relates in general to the field of television content creation and viewing, and more particularly to an apparatus and method to facilitate the customization of television content with supplemental data.

BACKGROUND OF THE INVENTION

Many television content and service providers wish to select and target their television content to enhance the effectiveness of television advertising. To do this, many select and/or create television content relying on broad demographic generalizations often based on geographical regions which are applied to thousands, if not millions, of people collectively. When television content is targeted towards such broad demographics which are further comprised of more specific demographic categories, such as, family, single male, single female, gay, black, young, old, low income, high income, etc., only very general customization can be achieved. When television content broadcast to a geographical region is customized towards the more specific demographics, then the targeted audience is limited to only those specific demographics, leaving the remaining demographic audiences un-targeted.

As the availability for two way communication between a viewer and a television service provider continues to increase, the opportunity to allow television service providers to more intelligently select and target their content becomes increasingly feasible. Since prior techniques only allow for targeting viewers on a broad scale based on a geographic region or on a narrow scale based on very specific demographics, they are too generalized or too specialized to adequately target each viewer.

SUMMARY OF THE INVENTION

In accordance with the present invention, an apparatus and method to facilitate the customization of television content with supplemental data is provided which substantially eliminates or reduces disadvantages and problems previously associated with television content customization.

According to one embodiment of the present invention, an apparatus, for customizing television content operates on a computing platform that is associated with a receiver and a display device. The platform may be located within a standard set-top box or integrated within the display device. The platform is capable of accessing supplemental data provided by a television service provider which may include a variety of display components. The platform includes a profile database that stores a viewer profile and a filter module that is coupled to the profile database. The filter module accesses the viewer profile and the supplemental data, and, in response, selects a preferred display component according to the viewer profile and the supplemental data. The preferred display component is capable of targeting a particular viewer relative to other viewers.

In another embodiment of the present invention, a method for customizing television content is performed on a computing platform associated with a television receiver and a television service provider. A viewer profile is stored on a profile database. This viewer profile is then transferred, partial or wholly, to a television service provider. The television service provider then selects a preferred display component using a computing platform similar or the same as the one described above. This computing platform would be resident at the television service provider end as opposed to the viewer end. The preferred display component is then transferred from the television service provider to the particular viewer associated with the viewer profile to be processed accordingly. This allows the television service provider to target a particular viewer which is associated with the viewer profile.

Another embodiment contemplates having a computing platform at the viewer end receive an abbreviated reference where each abbreviated reference is associated with a specific display component. The computing platform at the viewer end would then select a particular abbreviated reference and transmit a request to the television service provider for the preferred display component that is associated with that particular abbreviated reference. The television service provider would then transmit the preferred display component to the computing platform. The television service provider would be able to identify the computing platform through addressable means such as an addressable set top box or any other means of identifying a computing platform located at a remote location from the television service provider.

The apparatus and method for customizing television content of the present invention provides a number of important technical advantages. The present invention stores profiles for one or more viewers that are used by television service providers to determine which content is most likely to appeal to each particular viewer. The viewer profile is in a simple and understandable format that allows television service providers to more intelligently select content for transmission to particular viewers without requiring targeting of viewers on an overly broad or overly narrow scale.

BRIEF DESCRIPTION OF THE DRAWINGS

For a more complete understanding of the present invention and for further features and advantages thereof, reference is now made to the following description taken in conjunction with the accompanying drawings in which like reference numbers indicate like features and wherein.

DETAILED DESCRIPTION OF THE INVENTION

Figure 1:
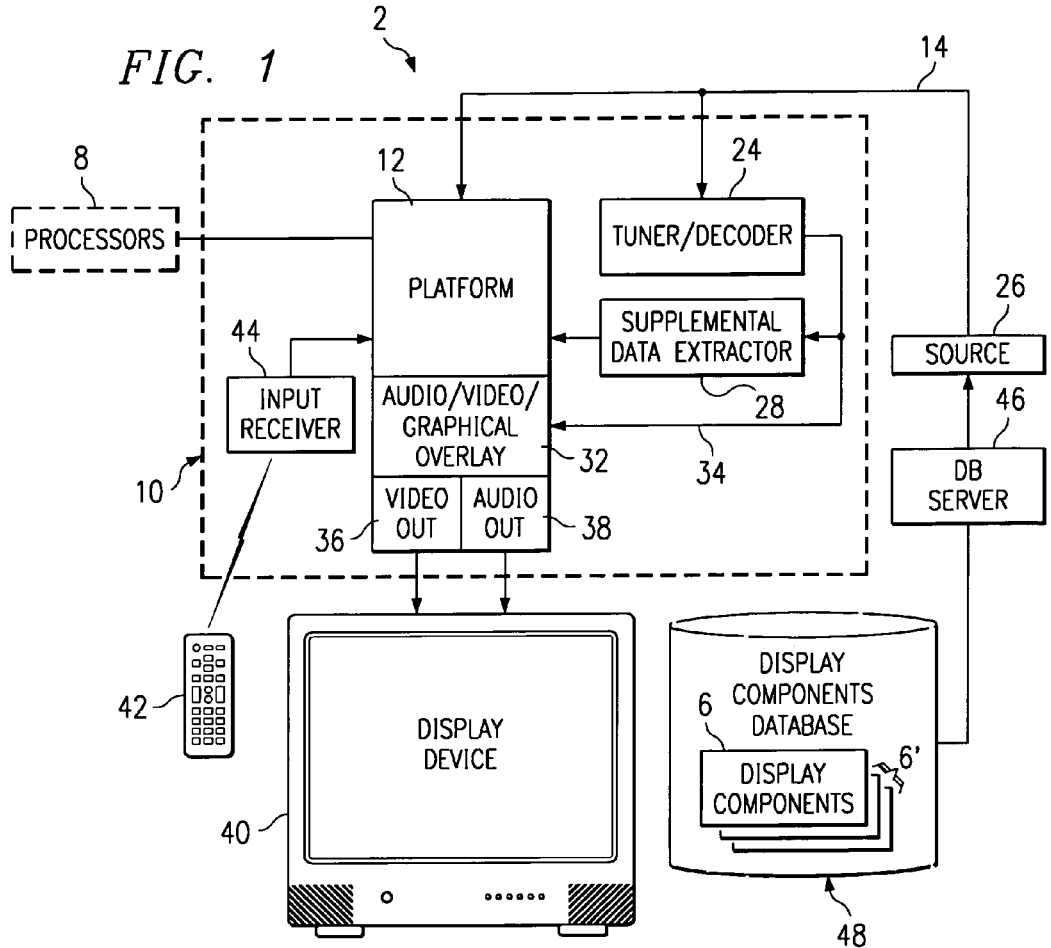
FIG. 1 illustrates a television system according to the present invention.

FIG. 1 illustrates a television system 2 that includes a television receiver 10 that is associated with a television or other suitable display device 40. Receiver 10 includes a platform 12 that operates on one or more processors 8, such as a digital signal processor (DSP) chip, an advanced reduced instruction set computer (RISC) machine (ARM), a general purpose processor such as a Pentium, MIPS, etc., or any other suitable processing platform. Platform 12 is coupled to a television service provider using a bi-directional link 14. In general, platform 12 contains a filter that would allow platform 12 to filter a preferred display component, i.e., a targeted advertisement, from supplemental data which is comprised of numerous display components. The preferred display component would then be displayed on display device 40 The structure of platform 12 is discussed more fully below with reference to FIG. 2.

The preferred display component may be executable code, such as ActiveX controls or may be interpretive code, such as Java Applets or Java Scripts. The preferred display component may further include media data, such as images (JPEG, GIF, bitmap, etc.), graphics (2D, 3D, etc.), audio (MP3, MPEG, MIDI, etc.), or video (MPEG, Quicktime, H.263, etc.).

The link 14 may be any dedicated or switched connection to a public switch telephone network (PSTN), an integrated services digital network (ISDN), a coaxial cable network, a satellite or microwave link, or any other wireless or wireline communications link suitable to couple platform 12 to a television service provider. The link 14 may be the same physical link that the television service provider uses to transmit television content such as television program to viewers.

The database server 46 coupled to the television service provider accesses a display component database 48, which contains data in the form of numerous display components 6 that are periodically updated according to the operation of an organization associated in some manner with server 46 and database 48. Television service provider source 26 may be any suitable cable television system (CAT), direct broadcast satellite system (dBase), regular satellite broadcast system, conventional television broadcast system, or other suitable system for providing television signals to receiver 10.

An application running on platform 12 periodically receives information from database 48 using link 14 and server 46 to receive display components 6 which allows the application to provide television-related functionalities to viewers associated with receiver 10 and display device 40, as discussed more fully below with reference to FIG. 2.

Receiver 10 includes one or more tuner/decoders 24 that receives television signals from television service provider source 26. One or more audio/video/graphical overlays 32 are coupled to platform 12 and coordinate the integration of television programming signals and a preferred display component 6' in accordance with the operation of platform 12. A supplemental data extractor 28 such as a vertical blanking interval (VBI) decoder or MPEG-2 user-data extractor coupled to tuner/decoder 24 receives decoded television signals from tuner/decoder 24, and separates supplemental information from the decoded television signals, for example, Intercast, closed-captioning, Teletext, or any other supplemental information, and communicates the separated supplemental information to platform 12. Tuner/decoder 24 also communicates the decoded television signals to audio/video/graphical overlays 32 under control of an application running on platform 12 using television line 34. Audio/video/graphical overlays 32 communicate outputs to video output 36 and audio output 38.

In one embodiment, video output 36 can be a super video (S-video) output or any other suitable video output. Audio output 38 may support any suitable combination of mono, stereo, surround, or other audio information. Video output 36 is coupled with display device 40, and audio output 38 may also be coupled to display device 40, or alternatively audio output 38 can be coupled to an external sound device such as a stereo sound system. The present invention contemplates video output 36 and audio output 38 integral to display device 40 in accordance with the design of receiver 10 and system 2. Input device 42 includes a remote control, wireless mouse and keypad, or other suitable pointer to communicate infrared, electronic, or other input signals to input receiver 44 of receiver 10. Components of receiver 10 may be at one or more locations integral to or separate from display device 40, such as a set top box, a network computer or other processing device, or any other component coupled to, or included in, display device 40.

In the operation of system 2, tuner/decoder 24 receives a television signal from television service provider source 26 and decodes the television signal as necessary or appropriate. Before, during, or after tuner/decoder 24 receives the television signal from television service provider source 26, a viewer associated with display device 40 selects a particular channel for viewing, using input device 42 or in any other suitable manner. Tuner/decoder 24 communicates a decoded television signal corresponding to the selected channel to audio/video/graphical overlays 32 and data extractor 28, which in turn communicates the extracted data to platform 12. More or less simultaneously, platform 12 receives the display components 6 using link 14 for integration with the decoded television signal according to an application 70 (FIG. 2) operating on platform 12. The application 70 operating on platform 12 also provides various functionalities that allow television service providers to more intelligently select viewing content according to viewer profiles, as discussed more fully below with reference to FIG. 2.

Audio/video/graphical overlays 32 integrate a preferred display component 6', any appropriate data received from the data extractor 28, and the television signal for the selected channel received from tuner/decoder 24 according to the application operating on platform 12 that controls the integration of this information. Audio/video/graphical overlays 32 then communicate the integrated information to display device 40 using video output 36 and audio output 38 for viewing.

Typical integration of television signals and display components might result visually as the regular television broadcast may be in a first display area on display device 40 and the preferred display component 6' may be in a second display area on display device 40. In one embodiment, platform 12 allows the first and second display areas to be moved, sized, merged, blended, overlayed, or manipulated according to the corresponding application to provide more sophisticated collective displays than were possible using prior systems. The present invention contemplates communicating supplemental information in the form of display components 6 from television service provider source 26 using bandwidth of the particular television signal for the channel. Data extractor 28 would decode and communicate this information to platform 12, which would then filter the appropriate preferred display component 6'. Other suitable arrangements necessary to allow platform 12 to integrate television signals and display components 6 are contemplated, without departing from the intended scope of the present invention.

Figure 2:
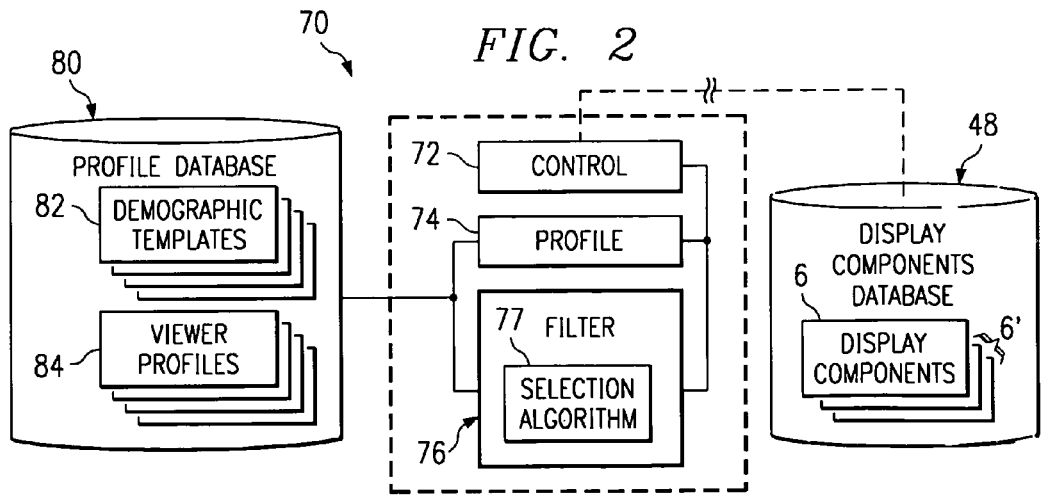
FIG. 2 illustrates an application for customizing television content according to the present invention.

FIG. 2 illustrates an application 70, which may run on platform 12 and processor 8 and may be installed locally on receiver 10 or an associated processing platform. In one embodiment, application 70 includes a control module 72, a profile module 74 and a filter module 76, that cooperate to provide various functionalities, as discussed below. According to operation of control module 72, profile module 74, filter module 76 and any other appropriate components, application 70 accesses display components 6 in database 48 in cooperation with database server 46, as discussed above with reference to FIG. 1. The present invention contemplates storing supplemental data in the form of numerous display components 6 remotely at the television service provider source 26. In general, application 70 allows a television service provider to more intelligently select and schedule viewing opportunities according to a viewer profile associated with the viewer.

Control module 72 interfaces with the components of platform 12 and system 2 as necessary to retrieve display components 6. For example, if display components 6 for a particular television content are desired, control module 72 might call a routine to retrieve the desired display components 6 in database 48. After the appropriate display components 6 are returned, control module 72 communicates the display components 6 to other components of application 70, such as profile module 74 or filter module 76, according to the operation of these components. Control module 72 also coordinates communications between profile module 74 and filter module 76 as appropriate. In one embodiment, control module 72 prompts the viewer for and receives a viewer identity in response to the viewer turning on display device 40 or in some other manner accessing the resources of application 70.

Profile module 74 receives demographic information from one or more viewers associated with receiver 10, such as multiple viewers within a family that owns television system 2, and constructs, builds, or otherwise generates corresponding viewer profiles 84 for storage in profile database 80. The present invention contemplates each viewer having a separate viewer profile 84, one or more viewers, such as children, having a combined viewer profile 84, or any other suitable arrangement with respect to viewer profiles 84. Furthermore, one or more viewer profiles 84 may be added, deleted, modified, inactivated, reactivated, or otherwise manipulated at any time according to the operation of application 70. Profile database 80 may include one or more databases, files, lists, or other arrangement of information at one or more locations that are integral to or separate from receiver 10.

In one embodiment, profile database 80 also contains one or more demographic templates 82 that profile module 74 may access and communicate to a viewer using control module 72 to receive demographic information from the viewer. For example, application 70 may communicate one or more demographic templates 82 to a viewer in response to the viewer pointing to, clicking on, or otherwise selecting a profile set-up option that application 70 displays on display device 40 as part of a windowing menu associated with application 70. The viewer might then select a particular demographic template 82 to begin constructing or modifying viewer profile 84 associated with the viewer. The present invention contemplates viewers interacting with application 70 in any suitable manner to select demographic templates 82. Application 70 may also allow the viewer to use input device 42 to link between templates 82 or viewer profiles 84 displayed on display device 40 according to the operation of application 70.

Demographic templates 82 stored in profile database 80 may include, without limitation: a category template 82 that lists possible demographic categories, for example, age, race, gender, marital status, sexual preference, income level, educational level, or other demographic categories. In addition, any other demographic template 82 suitable for constructing viewer profile 84 according to demographic information associated with the corresponding viewer may be used. Multiple demographic templates 82 may include the same or similar options that result in the viewer providing the same or similar demographic information.

After the viewer has provided demographic information to application 70 using the appropriate templates 82, profile module 74 stores the demographic information for the viewer in profile database 80 as a new or modified viewer profile 84 for the viewer. Application 70 may generate and store viewer profiles 84 for each viewer associated with system 2, may combine one or more viewer profiles 84 in accordance with particular needs, or may generate viewer profiles 84 in any other manner according to demographic information that one or more viewers provide to application 70.

Filter module 76 accesses the display components 6 in database 48, directly or using control module 72, and viewer profiles 84 in profile database 80, directly or using profile module 74, to select a preferred display component 6' that allows television service providers to more intelligently select programs that may be desirable for viewer consumption.

Figure 3A:
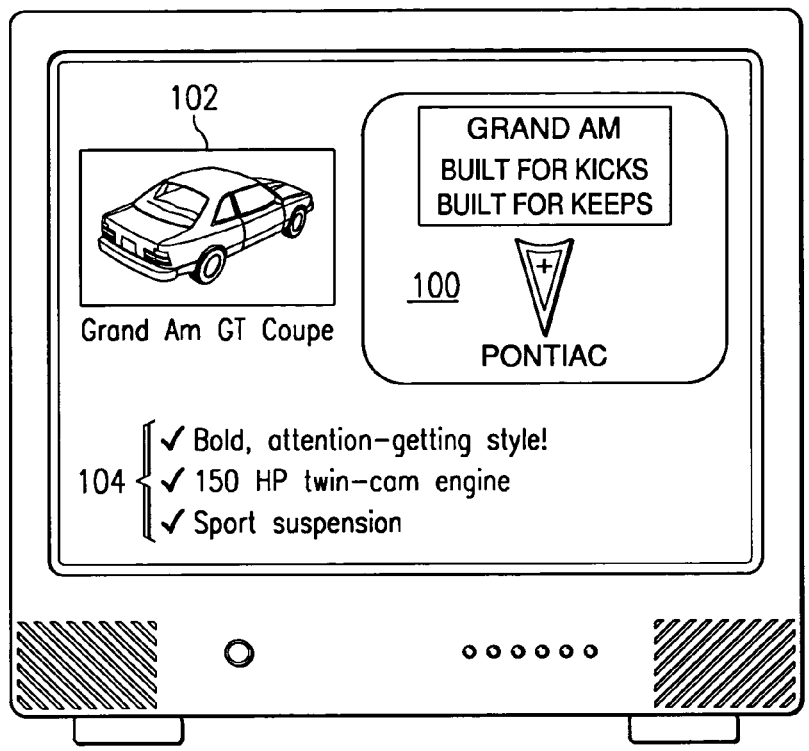
FIG. 3A illustrates an embodiment of a display for targeting advertising to a viewer.
Figure 3B:
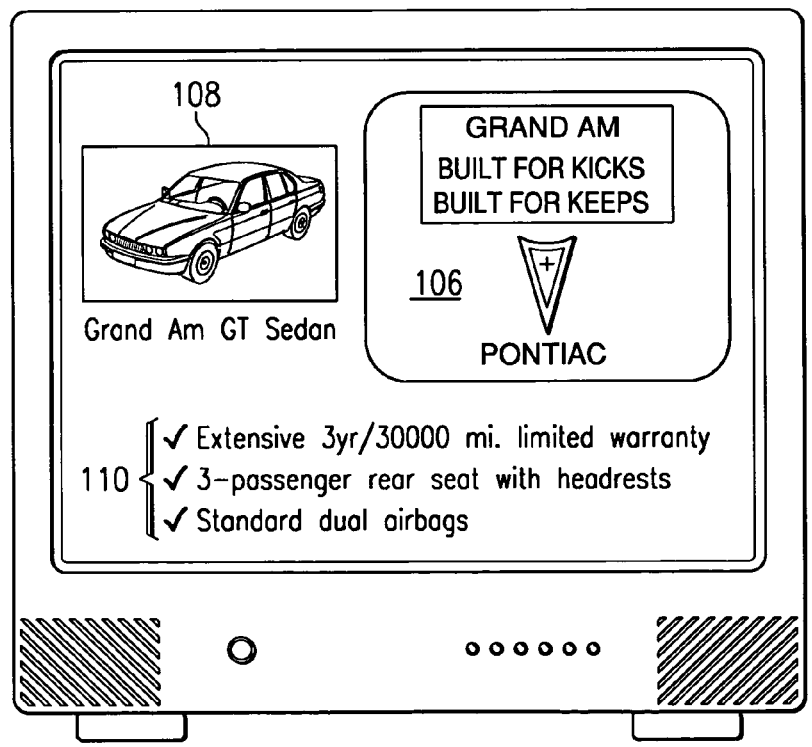
FIG. 3B illustrates another embodiment of a display for targeting advertising to a viewer.

FIGS. 3A and 3B illustrate two embodiments of a display for targeted advertising to a viewer through "micro-targeted" advertising insertion using profile-based television content customization. FIG. 3A illustrates an embodiment for targeting the demographic profile of a single male who is 20 to 40 years old. TV commercial 100 corresponds to a display area where a typical television commercial may be displayed on a television monitor. Still picture 102 and text 104 illustrates the supplemental information that may be contained in a preferred display component 6'. This preferred display component 6' facilitates the targeting of the television commercial by a television content and/or service provider. Still picture 102 and text 104 more specifically target a single male 20 to 40 years old by displaying information that may be more appealing to that particular demographic category, such as showing a 2-door coupe and emphasizing looks, performance, and handling. Similarly, FIG. 3B illustrates an embodiment for targeting a "Family" demographic profile. The television commercial 106, still picture 108 and text 110 may be viewed in the same display area as it was in FIG. 3A, but still picture 108 and text 110 now displays information that may be more appealing to the family demographic profile, such as showing a 4-door sedan and emphasizing reliability, comfort, and safety.

Using viewer profile 84 and an appropriate selection algorithm 77, filter module 76 selects a preferred display component 6' for television content currently being transmitted by a television service provider. In the operation of filter module 76, control module 72 communicates the viewer identity for the viewer and display components 6 to filter module 76. In response, filter module 76 accesses the corresponding viewer profile 84 in profile database 80. For each program, filter module 76 uses selection algorithm 77 to select a preferred display component 6' for targeting the viewer based on viewer profile 84. For example, assume viewer profile 84 for a particular viewer indicated to selection algorithm 77 that the viewer was a single male age 20 to 40 years old, selection algorithm 77 will select a preferred display component 6' based on data associated with that preferred display component 6' indicating that it is to be displayed to a viewer within that demographic profile. The identifying data associated with the preferred display component 6' may be any information, such as a specific data packet, that would allow the filter module to identify a preferred display component 6' and relate it to a particular demographic profile, such as a viewer profile 84 typical of a single male. Through the operation of the selection algorithm 77, display components 6 and viewer profile 84, the television service provider is able to target a viewer with a preferred display component 6'.

Figure 4:
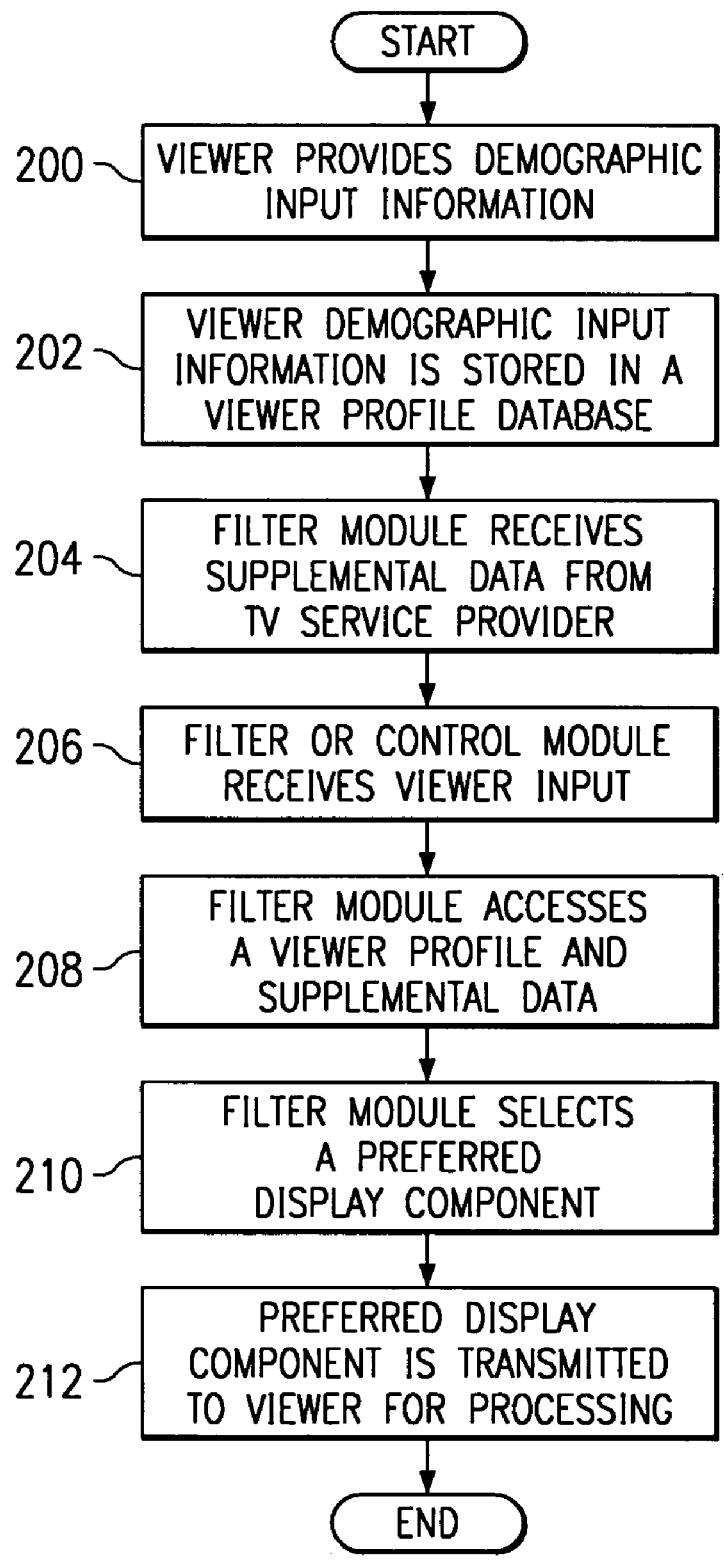
FIG. 4 is a flow chart illustrating an exemplary method for selecting a preferred display component for processing according to the present invention.

FIG. 4 is a flow chart illustrating an exemplary method for targeting viewers according to the operation of application 70. The method begins at step 200, where the viewer provides viewer demographic input information to application 70 using one or more demographic templates 82 and input device 42 or in any other manner. At step 202, profile module 74 receives the viewer demographic information, either directly or through control module 72, generates a viewer profile 84 for the viewer and stores the viewer profile 84 in profile database 80. At step 204, the filter module 76 receives the supplemental data from the television service provider source 26. Filter module 76, control module 72 or another suitable component of application 70 receives viewer input at step 206, which may include the viewer turning on television 40, accessing application 70 in some manner, or otherwise indicating that the viewer wishes to view television content.

At step 208, filter module 76 accesses viewer profile 84 in profile database 80 and display components 6 in the display component database 48, in cooperation with link 14 and database server 46. At step 210, filter module 76 and associated selection algorithm 77 determine a preferred display component 6'. At step 212, the preferred display component 6' is transmitted to a viewer for processing by receiver 10.

Although the present invention has been described with respect to several embodiments, many changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. An apparatus for customizing television content operable to run on a computing platform electrically coupled to a receiver which is electrically coupled to a display device, the apparatus operable to receive supplemental data from a supplemental data database maintained by a television service provider, the apparatus comprising:
    a television tuner/decoder operable to receive television signals from the television service provider and decode the received television signal;
    an input device operable with said television tuner/decoder enabling a viewer to select for viewing one television signal received by said television tuner/decoder;
    a supplemental data extractor operable to receive supplemental data from the television service provider;
    a profile database operable to store a viewer profile;
    a filter module electrically coupled to said profile database and to the supplemental data extractor, said filter module operable to access the viewer profile and the supplement data and, in response, to select a preferred display component according to the one television signal selected by the viewer via said input device, the viewer profile and the supplemental data, the preferred display component consisting of supplemental data selected by said filter module according to the viewer profile from among plural supplemental data corresponding to the one television signal selected by the viewer operable to target a particular viewer relative to other viewers by supplementing television content; and
    an overlay disposed proximate to the display device and remote from the television service provider, said overlay coupled to said television tuner/decoder and to said filter module to substantially simultaneously receive the decoded television signal and the preferred display component, said overlay operable to integrate said decoded television signal and said preferred display component for combined display via a display device.

2. The apparatus of claim 1, further comprising a profile module operable to receive viewer demographic information and, in response, to generate the viewer profile.

3. The apparatus of claim 2, wherein said profile module is operable to provide a demographic template to the viewer for receiving the viewer demographic information.

4. The apparatus of claim 1, wherein the viewer profile contains demographic categories corresponding to input options comprising:
    an age option;
    a race option;
    a gender option;
    a marital status option;
    an educational level option;
    a sexual preference option; and
    an income level option.

5. The apparatus of claim 1, wherein the filter module comprises a selection algorithm operable to select a preferred display component according to the viewer profile and the supplemental data.

6. The apparatus of claim 1, wherein:
    said overlay operate to integrate said decoded television signal and said preferred display component for display via a display device by displaying said decoded television signal in a first display area and said preferred display component in a second display area.

7. The apparatus of claim 1, wherein:
    said supplemental data extractor is coupled to said television tuner/decoder to extract said supplemental data from said decoded television signal.

8. A method performed on a computing platform that is associated with a display device and a receiver for providing functionality associated with an apparatus for customizing television content, the method comprising:
    storing a viewer profile in a profile database;
    receiving a plurality of television signals from a television signal provider;
    receiving a viewer selection of one of the plurality of television signals;
    receiving supplemental data from a display component database;
    accessing the viewer profile in the profile database and the supplemental data;
    selecting a preferred display component in accordance with the one television signal selected by the viewer, the viewer profile and supplemental data, the preferred display component consisting of supplemental data selected by said filter module according to the viewer profile from among plural supplemental data corresponding to the one television signal selected by the viewer operable to target a particular viewer relative to other viewers; and
    integrating at a location proximate to the display device and remote from the television service provider the one television signal and the preferred display component for combined display to a viewer.

9. The method of claim 8, wherein:

said step of selecting a preferred display component in accordance with the viewer profile and supplemental data includes transmitting an abbreviated reference associated with a specific display component to the viewer from the television service provider;

automatically selecting an abbreviated reference via the computing platform at a viewer location in accordance with the viewer profile;

requesting at the viewer location a preferred display component associated with the abbreviated reference from the television service provider; and transmitting the preferred display component from the television service provider to the viewer location.

10. The method of claim 8, further comprising the steps of:

receiving viewer demographic information; and generating the viewer profile according to the viewer demographic information.

11. The method of claim 10, further comprising the step of providing a demographic template to the viewer to receive the viewer demographic information.

12. The method of claim 8, wherein the viewer profile contains demographic categories corresponding to input options comprising:

an age option;

a race option;

a gender option;

a marital status option;

an educational level option;

a sexual preference option; and, income level.

13. The method of claim 8, wherein:

said step of integrating the received television signal and the preferred display component for display displays the decoded television signal in a first display area and the preferred display component in a second display area.

14. The method of claim 8, wherein:

said step of receiving supplemental data from a display component database extracts the supplemental data from the television signal.

* * * * *